(12) United States Patent
Katoh et al.

(10) Patent No.: US 7,926,853 B2
(45) Date of Patent: Apr. 19, 2011

(54) HEAT EXCHANGER PIPE JOINT

(75) Inventors: Yoshiki Katoh, Chita-gun (JP); Mitsugu Nakamura, Anjo (JP); Arinori Shimizu, Okazaki (JP); Sadayuki Kamiya, Kariya (JP); Hiroki Naganawa, Nishio (JP); Takaharu Nagoya, Okazaki (JP); Takayuki Hirose, Nishio (JP)

(73) Assignee: DENSO Corporation, Kariya (JP)

( * ) Notice: Subject to any disclaimer, the term of this patent is extended or adjusted under 35 U.S.C. 154(b) by 1027 days.

(21) Appl. No.: 11/708,166

(22) Filed: Feb. 15, 2007

(65) Prior Publication Data

US 2007/0205598 A1 Sep. 6, 2007

(30) Foreign Application Priority Data

Feb. 17, 2006 (JP) .................... 2006-041420
Jan. 11, 2007 (JP) .................... 2007-003926

(51) Int. Cl.
*F16L 39/00* (2006.01)
(52) U.S. Cl. .................... 285/124.2; 285/124.1
(58) Field of Classification Search .... 285/124.1–124.4, 285/382, 13, 14; 165/175, 153
See application file for complete search history.

(56) References Cited

U.S. PATENT DOCUMENTS

| | | | |
|---|---|---|---|
| 3,869,153 A | | 3/1975 | De Vincent et al. |
| 4,574,444 A | * | 3/1986 | Humpolik ............ 29/890.043 |
| 4,575,134 A | * | 3/1986 | Sugano ..................... 285/353 |
| 4,887,665 A | * | 12/1989 | Briet ............................ 165/76 |
| 5,022,461 A | * | 6/1991 | Potier et al. .................. 165/76 |
| 5,170,841 A | * | 12/1992 | Briet ............................ 165/76 |
| 5,224,537 A | * | 7/1993 | Potier ......................... 165/149 |
| 5,294,156 A | * | 3/1994 | Kumazaki et al. ......... 285/124.2 |
| 5,370,176 A | * | 12/1994 | Nishishita et al. .......... 165/81 |
| 5,477,919 A | * | 12/1995 | Karube ...................... 165/176 |
| 5,526,876 A | * | 6/1996 | Karube ...................... 165/176 |
| 5,556,138 A | * | 9/1996 | Nakajima et al. ......... 285/124.4 |
| 5,566,881 A | * | 10/1996 | Inoue et al. ............. 237/12.3 B |
| 5,630,326 A | * | 5/1997 | Nishishita et al. .......... 62/299 |
| 5,738,168 A | * | 4/1998 | Patel et al. .................. 165/151 |
| 5,774,982 A | * | 7/1998 | Hutchison et al. ......... 29/890.06 |
| 5,975,193 A | * | 11/1999 | Tokita et al. .................. 165/79 |

(Continued)

FOREIGN PATENT DOCUMENTS

DE 3503148 A1 * 8/1986

(Continued)

OTHER PUBLICATIONS

Office action dated Aug. 31, 2007 in German Application No. 07 007 571.7 with English translation thereof.

(Continued)

*Primary Examiner* — Aaron Dunwoody
(74) *Attorney, Agent, or Firm* — Harness, Dickey & Pierce, PLC

(57) ABSTRACT

A pipe joint structure includes a plurality of fluid flow path portions, a socket connected to the fluid flow path portions, a connection plate disposed to abut against the socket, a plurality of pipes connected to each other by the connection plate, and a seal member disposed between the plurality of pipes and the socket. The socket includes a connection portion that is located to cover an edge of the connection plate and to fix the plurality of pipes to the plurality of fluid flow path portions. The pipe joint structure can be suitably used for a heat exchanger.

15 Claims, 10 Drawing Sheets

U.S. PATENT DOCUMENTS

| | | | | |
|---|---|---|---|---|
| 6,000,465 | A * | 12/1999 | Kawahara | 165/132 |
| 6,044,900 | A * | 4/2000 | Kawahara | 165/110 |
| 6,129,394 | A * | 10/2000 | Bathla | 285/382 |
| 6,161,616 | A * | 12/2000 | Haussmann | 165/176 |
| 6,302,196 | B1 * | 10/2001 | Haussmann | 165/153 |
| 6,443,223 | B2 * | 9/2002 | Ichiyanagi | 165/178 |
| 6,443,502 | B1 * | 9/2002 | Iida et al. | 285/351 |
| 6,449,979 | B1 | 9/2002 | Nagasawa et al. | |
| 6,557,373 | B1 * | 5/2003 | Nitta | 62/509 |
| 6,749,015 | B2 * | 6/2004 | Moreau | 165/174 |
| 6,776,225 | B2 * | 8/2004 | Leitch et al. | 165/178 |
| 6,793,121 | B2 * | 9/2004 | Nitta et al. | 228/138 |
| 7,344,164 | B2 * | 3/2008 | Ichimura et al. | 285/203 |
| 7,364,208 | B2 * | 4/2008 | Ichimura et al. | 285/382 |
| 7,425,021 | B2 * | 9/2008 | Yamanashi et al. | 285/124.1 |
| 7,469,934 | B2 * | 12/2008 | Inaba et al. | 285/124.3 |
| 7,637,538 | B2 * | 12/2009 | Tchang et al. | 285/124.4 |
| 2001/0010263 | A1 * | 8/2001 | Ichiyanagi | 165/178 |
| 2003/0080564 | A1 * | 5/2003 | Izumi et al. | 285/382 |
| 2003/0173069 | A1 * | 9/2003 | Nitta et al. | 165/178 |
| 2003/0230402 | A1 * | 12/2003 | Leitch et al. | 165/178 |
| 2004/0036277 | A1 * | 2/2004 | Inaba et al. | 285/124.4 |
| 2004/0080159 | A1 * | 4/2004 | Schroeder et al. | 285/205 |
| 2004/0150222 | A1 * | 8/2004 | Ichimura et al. | 285/31 |
| 2004/0169369 | A1 * | 9/2004 | Takamatsu et al. | 285/124.1 |
| 2005/0023827 | A1 * | 2/2005 | Walterscheid et al. | 285/124.2 |
| 2005/0029806 | A1 * | 2/2005 | Yamanashi et al. | 285/124.1 |
| 2005/0263271 | A1 * | 12/2005 | Kazari et al. | 165/153 |
| 2006/0119098 | A1 * | 6/2006 | Chiba et al. | 285/124.3 |
| 2006/0119099 | A1 * | 6/2006 | Chiba et al. | 285/124.3 |
| 2006/0208479 | A1 * | 9/2006 | Ozaka et al. | 285/124.3 |
| 2007/0169508 | A1 | 7/2007 | Ichiyanagi | |
| 2008/0029259 | A1 * | 2/2008 | Rechea et al. | 165/178 |
| 2008/0264621 | A1 * | 10/2008 | Yoshino | 165/178 |
| 2009/0056921 | A1 * | 3/2009 | Arino et al. | 165/153 |
| 2010/0089561 | A1 * | 4/2010 | Sharma | 165/178 |

FOREIGN PATENT DOCUMENTS

| | | | |
|---|---|---|---|
| EP | 323337 A1 * | 7/1989 | |
| EP | 324903 A2 * | 7/1989 | |
| EP | 571286 A1 * | 11/1993 | |
| GB | 1 387 673 | 8/1972 | |
| JP | 56-119093 | 2/1955 | |
| JP | 58184316 A * | 10/1983 | |
| JP | 04262185 A * | 9/1992 | |
| JP | 05066064 A * | 3/1993 | |
| JP | 09-079190 | 3/1997 | |
| JP | 2001-027495 | 1/2001 | |
| JP | 2001-234965 | 8/2001 | |
| JP | 2001-280558 | 10/2001 | |
| JP | 2003-185081 | 7/2003 | |
| JP | 2003-307399 | 10/2003 | |
| JP | 2004-028393 | 1/2004 | |
| JP | 2006-003070 | 1/2006 | |

OTHER PUBLICATIONS

Office Action dated Jan. 25, 2011, in corresponding Japanese Application No. 2007-003926, with English translation thereof.

* cited by examiner

HEAT EXCHANGER PIPE JOINT

CROSS REFERENCE TO RELATED APPLICATION

This application is based on Japanese Patent Applications No. 2006-41420 filed on Feb. 17, 2006, and No. 2007-3926 filed on Jan. 11, 2007, the contents of which are incorporated herein by reference in its entirety.

FIELD OF THE INVENTION

The present invention relates to a pipe joint apparatus for connecting a plurality of fluid flow path portions with a plurality of pipes, to a heat-exchanger pipe joint structure using the same, and to a method of assembling pipes to a heat exchanger, which are suitable for use in, for example, a refrigerant pipe joint of a refrigeration cycle for air conditioning.

BACKGROUND OF THE INVENTION

Such pipe joint structures for heat exchangers have hitherto been known in, for example, a patent document 1. Specifically, in a heat exchanger, fins are provided between a plurality of tubes through which refrigerant flows to form a core portion, and a pair of tank portions are disposed on both ends of the plurality of tubes. A socket connected to fluid flow paths on the inlet and outlet sides is disposed in the vicinity of one tank portion, and inlet and outlet pipes for allowing the refrigerant to flow thereto and therefrom are configured to be fixed to the socket.

The core portion, tank portions and socket are integrally formed by connection using brazing in a furnace. After the brazing in the furnace, one-side ends of the inlet and outlet pipes are disposed on an opening side of the socket, and then the inlet and outlet pipes are connected to the socket by torch brazing in another connection step. In other words, the inlet and outlet pipes are fixed to the fluid flow paths on a heat exchanger side via the socket through connection by the torch brazing.

A method for fixing an entrance pipe and a fluid flow path from a heat exchanger is known as disclosed in a patent document 2. In the patent document 2, on the tip side of the pipe, an insertion cylindrical portion and an annular bulge portion protruding in a radial outward direction are formed, and on the tip side of the fluid flow path, first, second and third circumferential surfaces are formed for insertion of the tip of the pipe.

The insertion cylindrical portion is inserted into the first circumferential surface, a seal member for keeping liquid tightness is abutted against the second circumferential surface, and the bulge portion is inserted into the third circumferential surface. The tip of the pipe is inserted into the tip side of the fluid flow path with the seal member disposed on the back of the insertion cylindrical portion. The tip side of the third circumferential surface is plastic-deformed inward to be fixed with the pipe in a state where the pipe is inserted into the fluid flow path.

[Patent Document 1] JP-A-2004-28393
[Patent Document 2] JP-A-2001-280558

As disclosed in the patent document 1, however, performing the torch brazing in another step disadvantageously leads to an increase in processing cost in a connection step in manufacturing of the heat exchanger. In addition, the inlet pipe and the outlet pipe are protruded from the heat exchanger in the transporting of the heat exchanger after the torch brazing. This results in poor transportability of the heat exchanger to an assembly workplace where the heat exchanger is to be assembled to an air conditioning duct, and in deteriorated interim storage capability of the heat exchanger at the assembly workplace.

In order to improve the transportability and the interim storage capability, a method for fixing the heat exchanger by fastening has been proposed as disclosed in the patent document 2. In this case, inlet and outlet pipes, and fluid flow paths on the inlet and outlet sides are separately fixed, thereby leading to an increase in the number of steps of assembly. Furthermore, an adjustment step of adjusting an attachment pitch between the pipes needs to be provided, which disadvantageously results in poor productivity.

SUMMARY OF THE INVENTION

In view of the foregoing problems, it is an object of the present invention to provide a pipe joint apparatus, a heat-exchanger pipe joint structure and a method of assembling a pipe to a heat exchanger, which can effectively reduce and prevent above-described problems.

According to an aspect of the present invention, a pipe joint apparatus includes a plurality of fluid flow path portions, a socket connected to the fluid flow path portions, a connection plate disposed to abut against the socket, a plurality of pipes connected to each other by the connection plate, and a seal member disposed between the plurality of pipes and the socket. Furthermore, the socket includes a connection portion that is located to cover an edge of the connection plate and to fix the plurality of pipes to the plurality of fluid flow path portions. Accordingly, the plurality of pipes can be collectively fixed to the plurality of fluid flow paths with a simple joint structure. This can decrease the number of assembly steps, thereby improving the productivity. Even when an attachment pitch between the plurality of pipes is set smaller, these pipes can be stabilized, thereby miniaturizing the socket. For example, the connection portion of the socket can be fastened to the connection plate so as to cover the edge of the connection plate. This can reduce the processing cost in manufacturing as compared with the fixing by torch brazing. In addition, the fixing by fastening can improve the accuracy of the attachment pitch between the pipes because of less distortion.

According to another aspect of the present invention, a heat-exchanger pipe joint structure includes a heat exchanger including an inlet-side refrigerant flow path portion and an outlet-side refrigerant flow path portion, a socket connected to the inlet-side refrigerant flow path portion and the outlet-side refrigerant flow path portion, a connection plate disposed to abut against the socket, an inlet pipe and an outlet pipe, one ends of which are connected to each other by the connection plate, a joint provided at the other ends of the inlet pipe and the outlet pipe to join the other ends of the inlet pipe and the outlet pipe, and a seal member disposed between the inlet and outlet pipes and the socket. Furthermore, the socket includes a connection portion located to cover an edge of the connection plate and to fix the inlet pipe and the outlet pipe to the inlet-side refrigerant flow path portion and the outlet-side refrigerant path portion. In this case, the inlet pipe and the outlet pipe can be collectively fixed to the inlet-side refrigerant flow path and the outlet-side refrigerant flow path. In other words, the two pipes can be fixed to the two refrigerant flow paths at one time. This can decrease the number of assembly steps, thereby improving the productivity. Even when an attachment pitch between the inlet pipe and the outlet pipe is set smaller, these pipes can be stabilized, thereby miniaturizing the socket.

For example, the connection portion may be fastened to the edge of the connection plate over an entire periphery thereof. Alternatively, any one of the connection portion and the connection plate may include a fastening portion having a surface with projections and depressions formed thereon. In this case, the connection portion is fastened to the connection plate after crushing the projections.

According to another aspect of the present invention, a method of assembling a pipe to a heat exchanger includes: a step of preparing a heat exchanger with an inlet-side refrigerant flow path portion and an outlet-side refrigerant flow path portion connected to a socket; a step of preparing an inlet pipe and an outlet pipe such that one ends of which are connected to each other by a connection plate and the other ends of which are provided with a joint to be connected to the joint; a step of connecting the inlet pipe and the outlet pipe at a side of the one ends to the inlet-side refrigerant flow path portion and the outlet-side refrigerant flow path portion, respectively, by disposing a seal member between the inlet and outlet pipes and the socket; and a step of fixing the inlet-side refrigerant flow path portion and the outlet-side refrigerant flow path portion to the inlet pipe and the outlet pipe by applying processing to the socket such that the socket covers an edge of the connection plate. Accordingly, the inlet pipe and the outlet pipe can be collectively fixed to the inlet-side refrigerant flow path and the outlet side refrigerant flow path. In other words, the two pipes can be fixed to the two refrigerant flow paths at one time. This can decrease the number of assembly steps, thereby improving the productivity. Even when an attachment pitch between the inlet pipe and the outlet pipe is set smaller, these pipes can be stabilized, thereby miniaturizing the socket.

For example, the step of fixing the inlet-side refrigerant flow path portion and the outlet-side refrigerant flow path portion to the inlet pipe and the outlet pipe includes a process of fastening the edge of the connection plate over an entire periphery thereof by a connection portion formed at the socket. Alternatively, the connection portion may be subjected to a resin coating process after fastening the edge of the connection plate. Furthermore, the step of preparing the inlet pipe and the outlet pipe may includes a step of fixing the inlet pipe and the outlet pipe to the connection plate by inserting the inlet pipe and the outlet pipe into through holes formed in the connection plate and then by enlarging the pipes in size in the through holes, and a step of forming an annular bulge portion protruding in a radial outward direction in the vicinity of the connection plate after fixing the inlet pipe and the outlet pipe to the connection plate. Alternatively, the step of connecting the inlet pipe and the outlet pipe to the inlet-side refrigerant flow path portion and the outlet-side refrigerant flow path portion may includes a step of providing a sacrificial corrosive material at one side of the connection plate at which the seal member is disposed.

BRIEF DESCRIPTION OF THE DRAWINGS

Additional objects and advantages of the present invention will be more readily apparent from the following detailed description of preferred embodiments when taken together with the accompanying drawings. In the drawings.

DETAILED DESCRIPTION OF THE INVENTION

First Embodiment

A first embodiment of the present invention will be now described with reference to FIGS. 1 to 5D.

Figure 1:
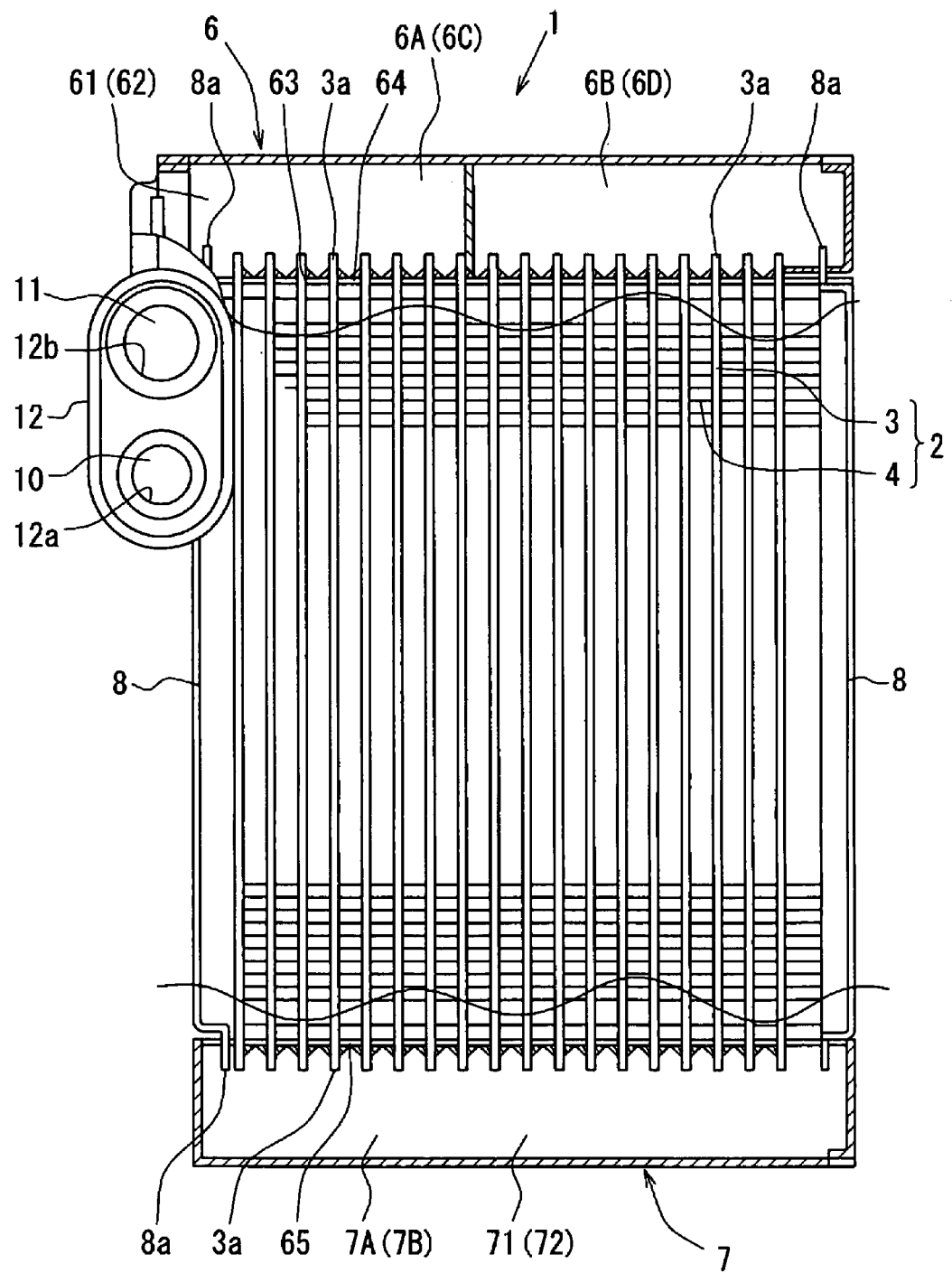
FIG. 1 is a partial sectional view showing a schematic structure of an evaporator (heat exchanger) according to a first embodiment of the invention.

FIG. 1 is a partial sectional view showing a schematic structure of an evaporator 1 according to the first embodiment. As shown in FIG. 1, an evaporator 1 which is an example of a heat exchanger is constructed of a core portion 2 including tubes 3 and fins 4 which are alternately laminated, an upper tank 6 and a lower tank 7 disposed on upper and lower ends of the core portion 2, and side plates 8 supporting the fins 4 at both ends of the core portion 2. An inlet side refrigerant flow path 10 is connected to an inlet portion 61 of the upper tank 6, while being adjacent to one side plate 8. An outlet side refrigerant flow path 11 is connected to an outlet portion 62. A socket 12 is connected to connect ends of these refrigerant flow paths 10, 11.

The evaporator 1 is constructed of an arrangement of two lines in a front and rear direction (see FIG. 2), each line consisting of the core portion 2, the upper tank 6 and the lower tank 7. The evaporator 1 exchanges heat between refrigerant flowing through the plurality of tubes 3 and air blown toward the front and rear direction by a blower not shown, thereby blowing off cold air (cool air) into a passenger compartment.

It should be noted that as described herein, the term "front and rear direction" means the direction of air flow blown by the blower from the windward side to the leeward side or the leeward side to the windward side. For example, in FIG. 1, the front side of the paper corresponds to the front side of the evaporator 1, the back side of the paper to the back side of the evaporator 1, and the left and right direction to a direction perpendicular to the front and rear direction. In this embodiment, the tubes 3 and the fins 4 are laminated in a lamination direction corresponding to the left and right direction, and the tubes 3 extend in a top and bottom direction in FIG. 1.

The upper tank 6 includes an upper left-rear tank portion 6A with a refrigerant inlet portion 61 disposed therein and connected thereto, an upper right-rear tank portion 6B adjacent to the upper left-rear tank portion 6A in the left and right direction, an upper left-front tank portion 6C disposed on the left side of the front line, and an upper right-front tank portion 6D disposed adjacent to the upper left front tank 6C in the left and right direction. These tank portions are coupled so as to allow the refrigerant to circulate through the tank portions. The upper left-front tank portion 6C has its left end in communication with the outlet portion 62.

The lower tank 7 is coupled to the upper tank 6 by each tube 3. The lower tank 7 is disposed such that the refrigerant flows between the upper tank 6 and the lower tank 7 via the respective tubes 3 in succession. The tank 7 is constructed of a lower rear tank portion 7A disposed in a rear line, and a lower front tank portion 7B disposed in a front line.

Each of the tubes 3 is formed in a flat rectangular cylindrical shape, and has inner fins inserted therein to form a plurality of flow paths. Each tube 3 has both ends inserted into the upper tank 6 and the lower tank 7 to constitute a circulation flow path.

As mentioned above, since the upper tank 6 and the lower tank 7 are disposed in the two front and back lines, the plurality of tubes 3 are divided into four groups in total located in the front, rear, left and right lines. The refrigerant flows from the inlet portion 61 into the upper left-rear tank portion 6A, and then flows to the lower rear tank portion 7A, the upper right-rear tank portion 6B, the upper right-front tank portion 6D, the lower front tank portion 7B, and the upper left-front tank portion 6C in that order via the respective tubes 3. Thereafter, the refrigerant flows outside the evaporator 1 from the upper left-front tank portion 6C through the outlet portion 62.

The tubes 3, the upper tank 6 and the lower tank 7, which are separately formed, are integrally constructed into one piece by being assembling to one another by brazing. That is, in the upper tank 6, a plurality of rectangular holes 63, into each of which one end of each tube 3 is inserted, are provided in parallel to one another in the direction of the flow path. A protrusion 3a of the tube 3 protruding from the rectangular hole 63 is fixed to a lower wall 64 of the upper tank 6 by brazing.

The side plate 8 has the upper end formed in a L shape toward the inside of the upper tank 6, and includes a protrusion 8a protruding into the upper tank 6 in the inner position from the end of the upper tank 6. The protrusion 8a of the side plate 8 is fixed to the lower wall 64 of the upper tank 6 by brazing.

Also, in the lower tank 7, the protrusion 3a of the tube 3 and the protrusion 8a of the side plate 8 are fixed to an upper wall 65 of the lower tank 7 by brazing in the same manner as in the above-described case.

Figure 2:
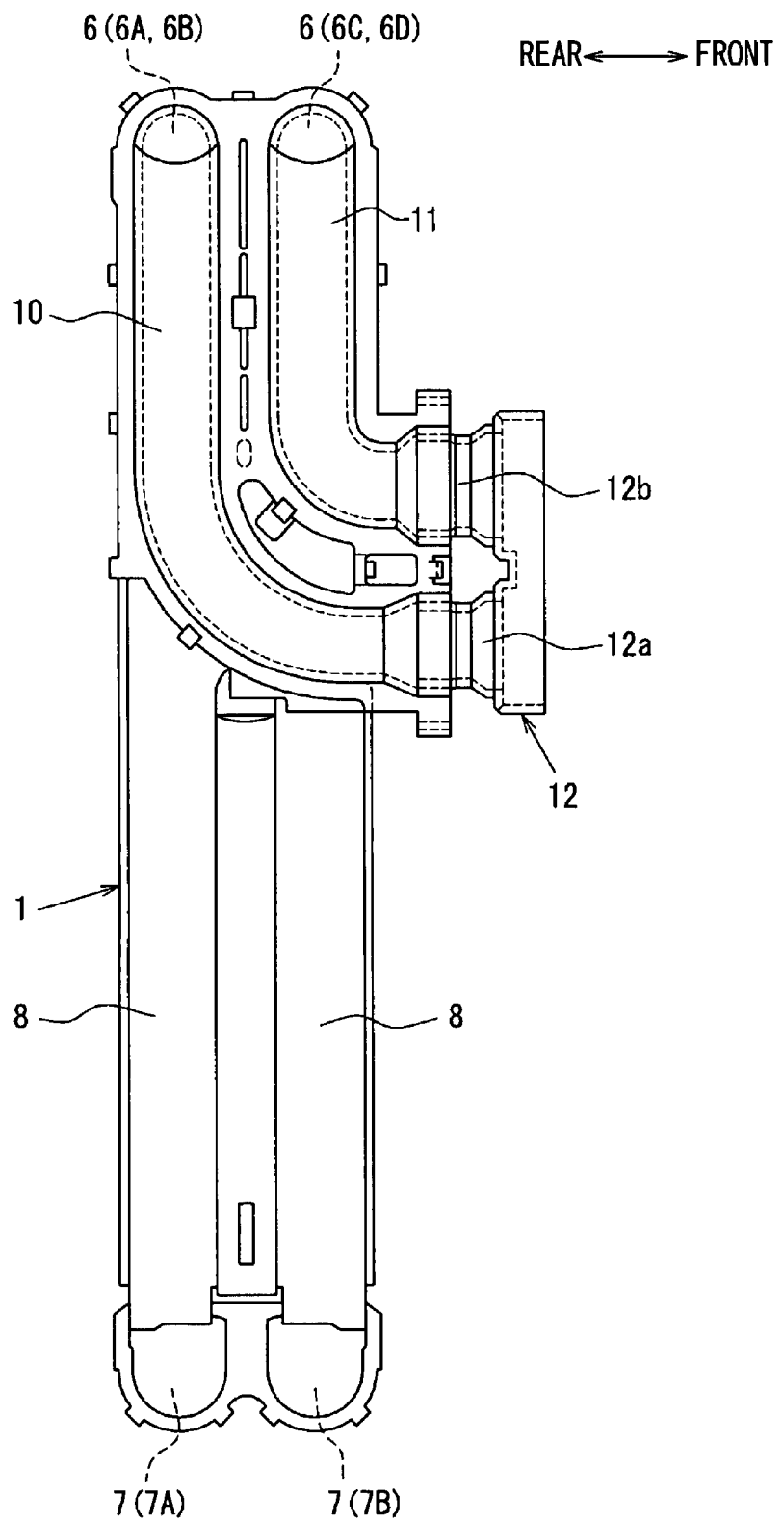
FIG. 2 is a left side view of the evaporator of FIG. 1.

The inlet side refrigerant flow path 10 and the outlet side refrigerant flow path 11 have one ends thereof connected to the upper left-rear tank portion 6A and the upper left-front tank portion 6C of the upper tank 6, as shown in FIG. 2, and extend downward in parallel to the tube 3, while being bent forward from an intermediate position of the core portion 2.

The tail end of the inlet side refrigerant flow path 10 is connected to an inlet side circumferential portion 127a formed in the socket 12, and the tail end of the outlet side refrigerant flow path 11 is connected to an outlet side circumferential portion 127b formed in the socket 12. The socket 12 fixes the inlet side refrigerant flow path 10 and the outlet side refrigerant flow path 11 to an inlet pipe 14 and an outlet pipe 15. Thus, the inlet pipe 14 and the outlet pipe 15 can be fixed collectively without being connected by brazing.

Figure 3:
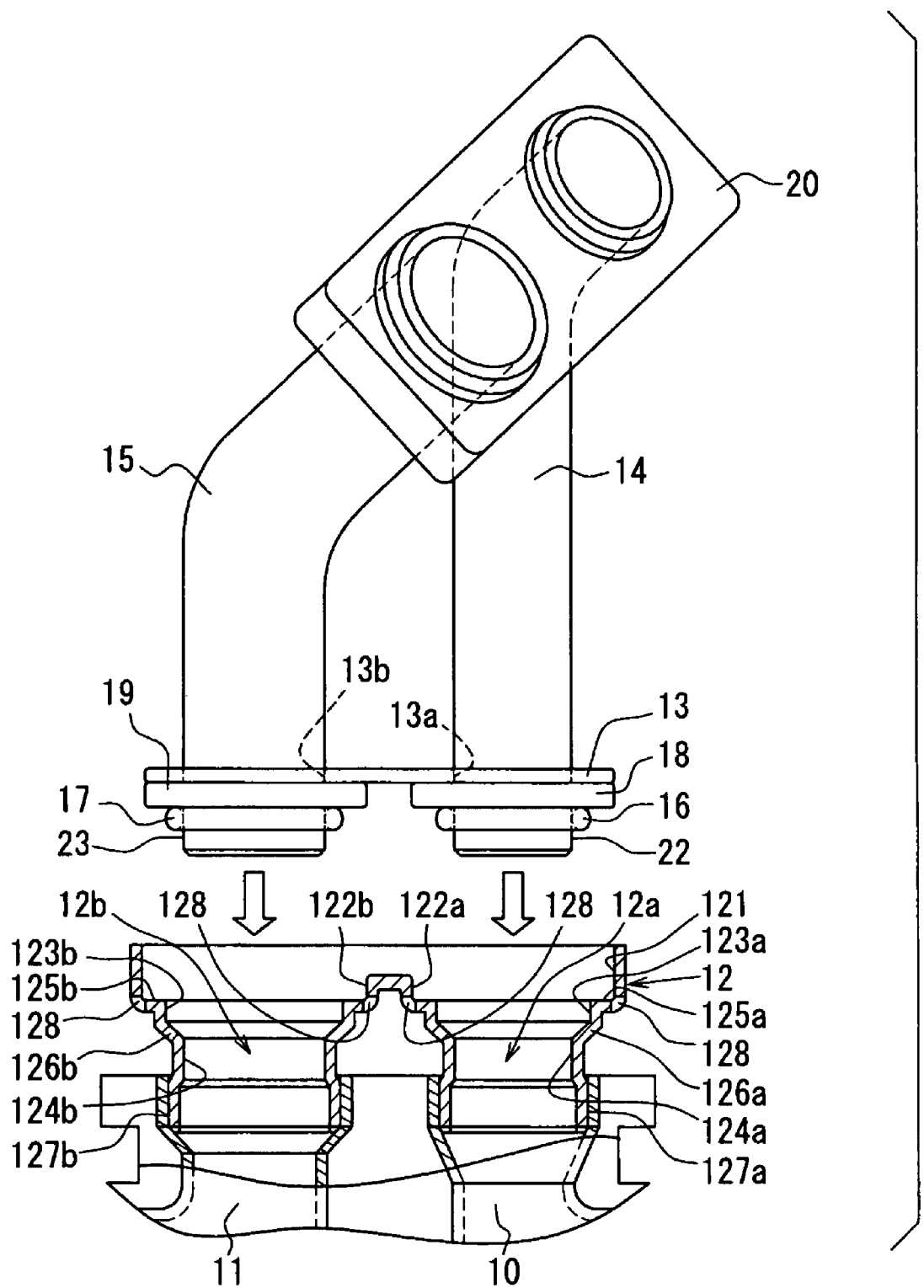
FIG. 3 is a schematic diagram showing the entire construction of a pipe joint structure of the evaporator of the first embodiment.
Figure 4:
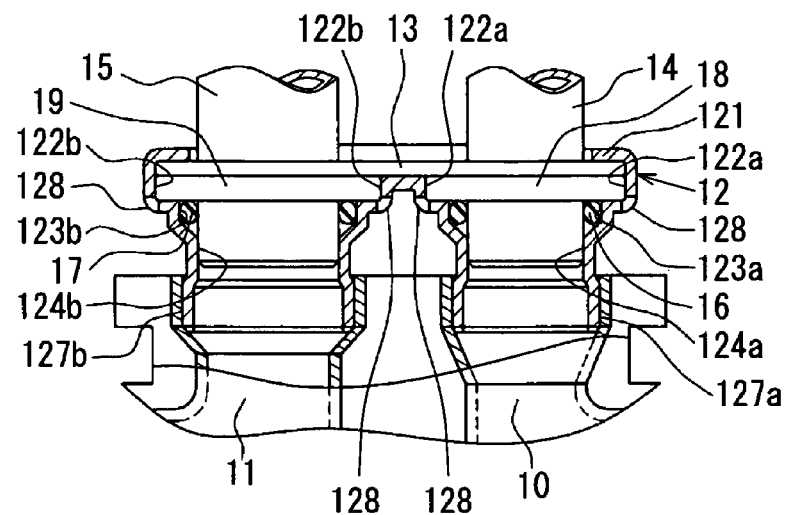
FIG. 4 is a schematic diagram showing a state in which an inlet pipe and an outlet pipe are fixed to a socket.

Specifically, as shown in FIGS. 3 and 4, the inlet pipe 14 and the outlet pipe 15 connected by a connection plate 13 are disposed in the socket 12, and are fixed to the socket 12 by fastening a connection portion 121 formed on the upper end (tip end) of the socket 12 so as to cover the outer peripheral edge of the connection plate 13.

Now, a pipe connection structure in which the inlet pipe 14 and the outlet pipe 15 are connected to the socket 12 will be described below. As mentioned above, one ends of the inlet pipe 14 and the outlet pipe 15 are connected and fixed to each other by the connection plate 13, and at the other ends of the inlet and outlet pipes, a joint 20 is detachably disposed.

The outlet pipe 15 is a refrigerant pipe having an outer diameter of, for example, about ⅝ inches on the outflow (outlet) side. The outlet pipe 15 is connected so as to allow the refrigerant evaporated by the evaporator 1 to flow into the suction side of a compressor of a refrigeration cycle. The inlet pipe 14 is a refrigerant pipe having an outer diameter of, for example, about ½ inches on the inflow (inlet) side. The inlet pipe 14 is connected to the outflow side of an expansion valve of the refrigeration cycle so as to allow the refrigerant decompressed by the expansion valve to flow toward the evaporator 1.

The inlet pipe 14 and the outlet pipe 15 have the same shape, except for the diameter size, and are made of aluminum material. Annular bulge portions 18, 19 protruding radially outward are integrally formed in the vicinity of the tips of the inlet pipe 14 and the outlet pipe 15.

An inlet side insertion cylindrical portion 22 and an outlet side insertion cylindrical portion 23 for installing O-rings 16, 17 serving as a seal member are formed on the further tip side from the bulge portions 18, 19. The connection plate 13 is disposed to abut against the inside of the bulge portions 18, 19, that is, a surface on the opposite side to the side on which the O-rings 16, 17 of the bulge portions 18, 19 are installed.

The connection plate 13 is formed using aluminum or aluminum alloy plate material to have a substantially elliptical profile. An inlet side through hole 13a and an outlet side through hole 13b penetrating the plate in a thickness direction are formed on one end side and the other end side in the longitudinal direction of the connection plate 13. The inlet pipe 14 and the outlet pipe 15 are inserted into and fixed to the inlet side through hole 13a and the outlet side through hole 13b, respectively, thereby positioning an attachment pitch (e.g., distance) between the inlet pipe 14 and the outlet pipe 15. The inlet pipe 14 and the outlet pipe 15 are respectively fixed to the inlet side through hole 13a and the outlet side through hole 13b of the connection plate 13 by being enlarged in size.

The socket 12 is formed by press molding, such as a drawing process, using aluminum or aluminum alloy plate material. The structure of the socket 12 includes an inlet side insertion hole 12a and an outlet side insertion hole 12b into which the tips of the inlet pipe 14 and the outlet pipe 15 are inserted, and a connection portion 121, as shown in FIG. 3.

The connection portion 121 is formed on the tail end of the socket 12, and is a recessed portion formed in a substantially elliptical shape corresponding to a profile of the connection plate 13. Furthermore, the connection portion 121 is formed to have a bottom surface abutted against one end surfaces of the bulge portions 18, 19 of the inlet pipe 14 and the outlet pipe 15. After inserting the inlet pipe 14 and the outlet pipe 15 into the inlet side insertion hole 12a and the outlet side insertion hole 12b, respectively, a flange surface formed on the outer periphery of the connection portion 121 is caulked to be fixed to the edge of the connection plate 13.

The inlet side insertion hole 12a and the outlet side insertion hole 12b are formed on the bottom surface of the connection portion 121, spaced apart from each other by a predetermined attachment pitch. Inside the inlet side insertion hole 12a and the outlet side insertion hole 12b, there are provided first, second, and third inner peripheral portions 122a, 122b, 123a, 123b, 124a, 124b formed concentrically, and first and second joint portions 125a, 125b, 126a, 126b for joining the end edges of the respective inner peripheral portions 122a, 122b, 123a, 123b, 124a, 124b adjacent to each other in the axial direction.

Among these elements, the first inner peripheral portions 122a, 122b, and the first joint portions 125a, 125b are formed to have the inner peripheral edges thereof abutted against the outer profile of the bulge portions 18, 19. The second inner peripheral portions 123a, 123b are formed to have the inner peripheral edges thereof abutted against the outer peripheral edges of the O-rings 16, 17 to constitute seal surfaces. The third inner peripheral portions 124a, 124b are formed such that the inlet side insertion cylindrical portion 22 and the outlet side insertion cylindrical portion 23 are insertable thereinto without a space therebetween.

The joint 20 is a connection joint for detachably connecting an external refrigerant pipe, and the inlet pipe 14 and the outlet pipe 15 are connected to the joint 20 by brazing. Reference numerals 127a, 127b illustrated in the figure indicate circumferential portions to which the tips of the inlet side refrigerant flow path 10 and the outlet side refrigerant flow path 11 are respectively connected. These circumferential portions 127a, 127b are formed to have outer peripheries thereof fitted into insertion grooves (not shown) formed on the tips of the inlet side refrigerant flow path 10 and the outlet side refrigerant flow path 11.

The socket 12 can be integrally manufactured with the evaporator 1 using brazing by connecting the circumferential portions 127a, 127b to the inlet side refrigerant flow path 10 and the outlet side refrigerant flow path 11. Reference numeral 128 is a drain hole for discharging water stored on the root side of the connection portion 121 toward the outside. A plurality of drain holes 128 are formed on the outer periphery on the root side of the connection portion 121.

In the evaporator 1 of the embodiment, since the socket 12 is disposed in the vertical direction (top-bottom direction), condensed water occurring on the inlet pipe 14 and the outlet pipe 15 invades the inside of the lower part of the connection plate 13 via a clearance in the caulked position (fastened position), or the lower inside of the socket 12 and the root of the connection 121. The condensed water can be discharged outward from the plurality of drain holes 128. That is, the condensed water is never stored in the clearance reaching the seal surfaces of the O-rings 16, 17.

Furthermore, in the evaporator 1, on some of load conditions of the refrigeration cycle, the condensed water occurring on the evaporator 1 sometimes freezes. At this time, the condensed water at the root side of the connection portion 121 may sometimes freeze. The condensed water invading the narrow clearance in freezing is increased in volume, but the drain holes 128 cause the inner pressure of the connection portion 121 to be released outward, thereby preventing frost cracking in the socket 12.

In this embodiment, the socket 12 is formed using the plate material by pressing, but the invention is not limited thereto. The socket 12 may be formed integrally by die-casting. In this case, the socket 12 is subjected to a cutting process to be shaped. However, this cutting process may cause a problem of an increase in processing cost.

Now, a pipe assembly method of a pipe connection structure for fixing the inlet pipe 14 and the outlet pipe 15 to the socket 12 with the above-described arrangement will be described below with reference to FIGS. 5A to 5D. The socket 12 is integrally assembled to each component including the inlet side refrigerant flow path 10 and the outlet side refrigerant flow path 11 which are to be connected to the evaporator 1 as shown in FIGS. 1 and 2.

In other words, the circumferential portions 127a, 127b of the socket 12 are fitted into the tail end portions of the inlet side refrigerant flow path 10 and the outlet side refrigerant flow path 11, and are temporarily assembled to each component of the evaporator 1. In this state, the circumferential portions are integrally connected to each other by brazing in the furnace.

Figure 5A:
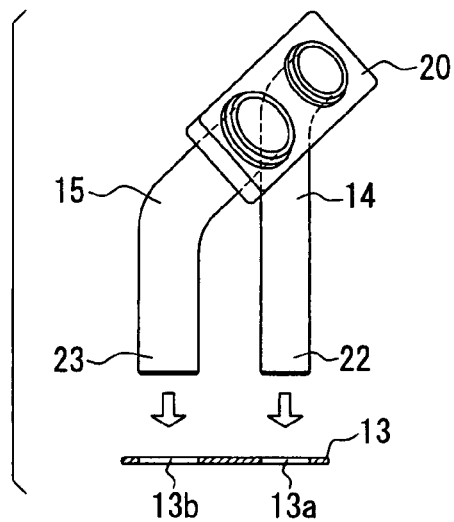
FIGS. 5A to 5D are explanatory diagrams showing operational steps for performing a pipe assembly method according to the first embodiment.

Then, the evaporator 1 to which the socket 12, the inlet side refrigerant flow path 10 and the outlet side refrigerant flow path 11 are connected by brazing is transported from an in-furnace brazing process area to a pipe assembly workplace for assembling the inlet pipe 14 and the outlet pipe 15. In the pipe assembly process, first, as shown in FIG. 5A, the connection plate 13 with the inlet side through hole 13a and the outlet side through hole 13b formed is prepared. That is, in FIG. 5A, the inlet pipe 14 and the outlet pipe 15 provided with the inlet side insertion cylindrical portion 22 and the outlet side insertion cylindrical portion 23 at one ends thereof, and with the joint 20 at the other ends thereof are prepared.

Furthermore, in FIG. 5A, the inlet side insertion cylindrical portion 22 and the outlet side insertion cylindrical portion 23 are respectively inserted into the inlet side through hole 13a and the outlet side through hole 13b of the connection plate 13 in an inserting. By forming the inlet pipe 14 and the outlet pipe 15 so as to enlarge inner peripheries thereof, the connection plate 13 is fixed to it predetermined position. In this inserting and enlarging step, the attachment pitch between the inlet pipe 14 and the outlet pipe 15 is positioned, thereby improving the accuracy of the attachment pitch.

Figure 5B:
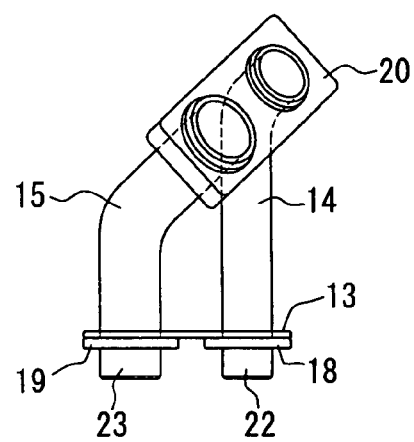

Next, as shown in FIG. 5B, the bulge portions 18, 19 are formed by a bulge process on the lower end sides of the inlet pipe 14 and the outlet pipe 15 which are provided with the connection plate 13. In this bulge step, one end surface (lower end surface in FIG. 5B) of the connection plate 13 is abutted against the bulge portions 18, 19.

Figure 5C:
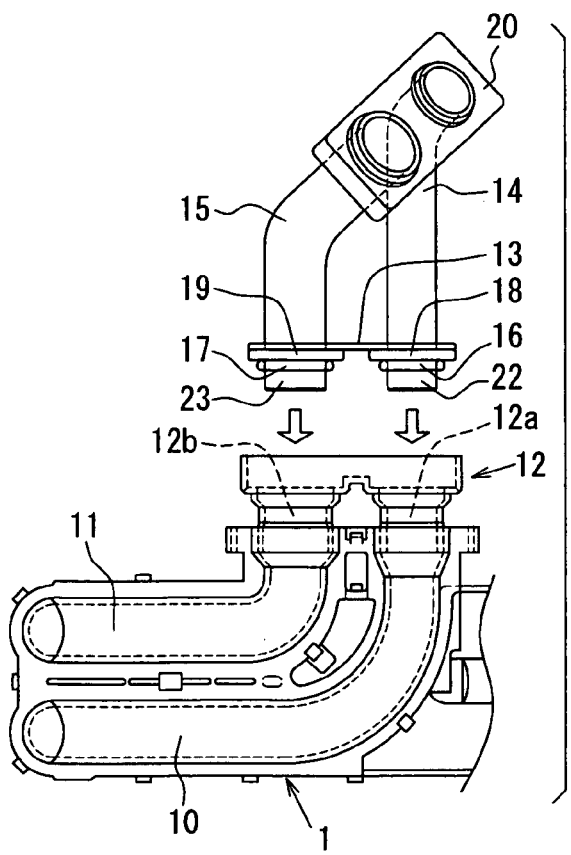

Then, as shown in FIG. 5C, the evaporator 1 to which the inlet side refrigerant flow path 10, the outlet side refrigerant flow path 11 and the socket 12 are connected is prepared. And, the inlet pipe 14 and the output pipe 15, one ends of which are connected by the connection plate 13 and the other ends of which are connected by the joint 20, are prepared.

Then, the inlet pipe 14 and the outlet pipe 15 are inserted into the inlet side insertion hole 12a and the outlet side insertion hole 12b of the socket 12, respectively, to be fixed to the socket 12, with the O-rings 16, 17 being installed on the inlet side insertion cylindrical portion 22 and the outlet side insertion cylindrical portion 23, respectively. The inlet pipe 14, the outlet pipe 15 and the socket 12 are fixed by brazing or fastening.

Figure 5D:
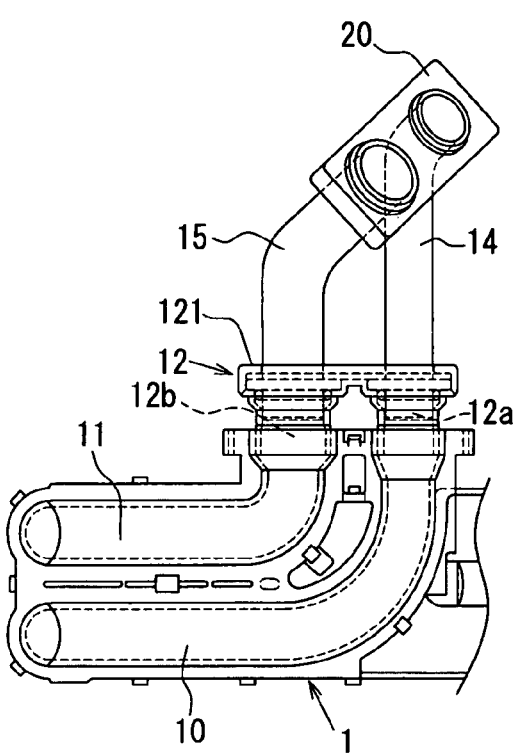

Next, as shown in FIG. 5D, the connection portion 121 of the socket 12 is caulked and fastened over the entire periphery so as to cover the edge of the connection plate 13. In this fastening step, the inlet pipe 14 and the outlet pipe 15 are fixed to the socket 12.

As mentioned above, the inlet pipe 14 and the outlet pipe 15 are fixed by the connection plate 13, and then can be attached collectively to the socket 12. This can decrease the number of assembly steps, thereby improving the productivity. Even when the attachment pitch between the inlet pipe 14 and the outlet pipe 15 is set smaller, these pipes can be stabilized, thereby miniaturizing the socket 12.

The edge of the connection plate 13 is fastened over the entire periphery by the connection portion 121, so that the connection plate 13 can be firmly fixed to the socket 12. Further, fastening the connection plate 13 over the entire periphery thereof can prevent the condensed water from invading the seal surfaces of the O-rings 16, 17.

This kind of evaporator 1 is generally a heat exchanger disposed in an air conditioning duct (not shown) of an air conditioner for a vehicle made of resin. The evaporator 1 including the inlet side refrigerant flow path 10, the outlet side refrigerant flow path 11 and the socket 12 is manufactured in a brazing furnace, and then transported from the brazing workplace to an arrangement workplace at the air conditioning duct.

In the arrangement workplace for arrangement onto the air conditioning duct, as mentioned above, the inlet pipe 14 and the outlet pipe 15 are connected and fixed to the socket 12. Since the inlet pipe 14 and the outlet pipe 15 are designed to be assembled at the arrangement workplace in the air conditioning duct, the evaporator 1 can be transported to the arrangement workplace at the air conditioning duct before being connected to the inlet pipe 14 and the outlet pipe 15. This improves the transportability and interim storage capability of the evaporator 1.

Although in the embodiment, the edge of the connection plate 13 is fastened over the entire periphery by the connection portion 121, the invention is not limited thereto, and the outer peripheral edge of the connection plate 13 may be partially caulked and fastened by the connection portion 121.

Furthermore, a protrusion portion protruding toward the inner periphery of the connection portion 121 may be formed and fastened so as to abut against the upper surface of the connection plate 13. The connection of the connection plate 13 with the socket 12 is not limited to the fastening. The connection plate 13 may be fixed to the socket 12 by bolting.

In the embodiment, the bulge portions 18, 19 are formed by the bulge process in the inlet side insertion cylindrical portion 22 and the outlet side insertion cylindrical portion 23 of the inlet pipe 14, and the outlet pipe 15 and the O-rings 16, 17 are provided on the outer peripheries of the inlet side insertion cylindrical portion 22 and the outlet side insertion cylindrical portion 23 so as to abut against the bulge portions 18, 19, but the invention is not limited thereto. Alternatively, annular recessed grooves may be formed by a spinning process in the inlet side insertion cylindrical portion 22 and the outlet side insertion cylindrical portion 23, and the O-rings 16, 17 may be mounted in the recessed grooves.

Now, an operation of the evaporator 1 with the above-described structure will be described below. In the refrigeration cycle, vapor-liquid two-phase refrigerant reduced in pressure by an expansion valve (not shown) exchanges heat with the outside air to evaporate refrigerant in the evaporator, and flows out as refrigerant gas. Liquid refrigerant is introduced from the inlet pipe 14 into the inlet portion 61 of the upper left-rear tank portion 6A of the evaporator 1 through the inlet side refrigerant flow path 10.

When the vapor-liquid two-phase refrigerant introduced into the inlet portion 61 flows into the upper left-rear tank portion 6A, it exchanges heat with the outside air through the tubes 3 to flow into the lower rear tank portion 7A. The refrigerant flowing into the lower rear tank portion 7A flows from the left side to the right side of the lower rear tank portion 7A, further is directed upward in the tubes 3, and then flows into the upper right-rear tank portion 6B, while exchanging heat with the outside air passing between the tubes 3.

Thereafter, the refrigerant flows into the upper right-front tank portion 6D from the upper right-rear tank portion 6B, and is directed downward from the upper right-front tank portion 6D through the tubes 3 to flow into the lower front tank portion 7B, while exchanging heat with the outside air passing between the tubes 3. The refrigerant flowing into the lower front tank portion 7B is moved from the right side to the left side, and then flows upward through the tubes 3. The refrigerant flows from the outlet portion 62 to the outlet side refrigerant flow path 11, the socket 12, and the outlet pipe 15 in that order, outside of the evaporator 1 via the upper left-front tank portion 6C to be guided to the compressor of the refrigeration cycle.

At this time, condensed water occurs at the inlet pipe 14 and the outlet pipe 15. Particularly, the condensed water occurring at the roots of the inlet pipe 14 and the outlet pipe 15 is transferred through a clearance between the fastened part of the connection portion 121 and the edge of the connection plate 13, and invades the inside of the connection plate 13. Since the plurality of drain holes 128 are formed in the root (lower end part) of the connection portion 121, the condensed water is discharged from these drain holes 128 to the outside of the socket 12.

The condensed water entering or invading toward the inside of the connection plate 13 sometimes freezes depending on the load conditions of the refrigeration cycle. Even at this time, pressure occurring when the condensed water expands its volume in freezing can discharge the condensed water from the drain holes 128. This can prevent frost cracking in the joint structure.

By fastening of the connection portion 121 of the socket 12, the socket 12 is fixed to the connection plate 13. Thus, another fixing member, such as a screw or a rivet, as well as high-cost work, such as torch brazing, are not required, which results in a decrease in process costs. Furthermore, without connection by the torch brazing, the accuracy of the attachment pitch between the inlet pipe 14 and the outlet pipe 15 can be improved.

Second Embodiment

A second embodiment of the present invention will be now described with reference to FIGS. 6A to 6C.

In the second embodiment, in order to improve the corrosion protection property of the seal surfaces of the O-rings 16, 17, a sacrificial corrosive material 13c is formed to be positioned in the vicinity of the seal surfaces of the O-rings 16, 17. That is, by providing the sacrificial corrosive material 13c in the vicinity of the connection plate 13, the corrosion protection property of the seal surfaces of the O-rings 16, 17 is improved, at a position on which the outer peripheral edges of the O-rings 16, 17 abut against the inner peripheral edges of the second inner circumferential portions 123a, 123b formed in the socket 12.

Figure 6A:
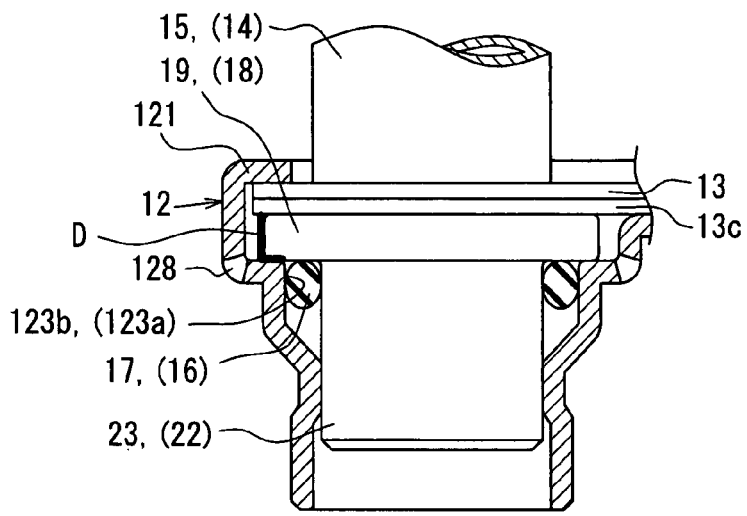
FIGS. 6A to 6C are partial sectional views each of which shows a pipe joint structure for an evaporator (heat exchanger) according to a second embodiment of the present invention.

First, as shown in FIG. 6A, the sacrificial corrosive material 13c is integrally formed with the connection plate 13 at one end surface side at which the O-rings 16, 17 of the connection plate 13 are disposed. In other words, the connection plate 13 is formed such that the sacrificial corrosive material 13c abuts against each one end surface of the bulge portions 18, 19 formed in the inlet pipe 14 and the outlet pipe 15.

With this, a distance D for sacrificial corrosion protection (See FIG. 6A) from one end surface of the sacrificial corrosive material 13c to the seal surfaces of the O-rings 16, 17 in a pipe connection direction can be shorten. Thus, even if the corrosion occurs due to the condensed water in the socket 12, a difference in potential between the sacrificial corrosive material 13c and the material of the socket 12 causes the sacrificial corrosion. While the sacrificial corrosive material 13c side is corrosive, the seal surfaces of the O-rings 16, 17, that is, the inner peripheral edges of the second inner peripheral portions 123a, 123b can be prevented from corroding.

Figure 6B:
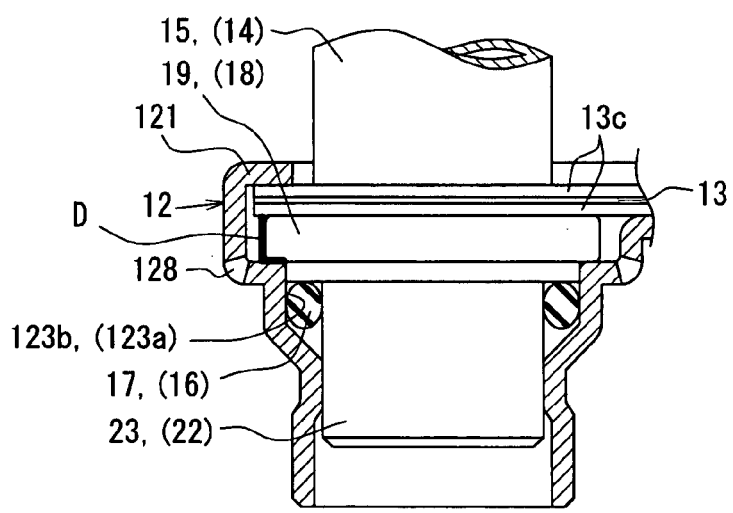
Figure 6C:
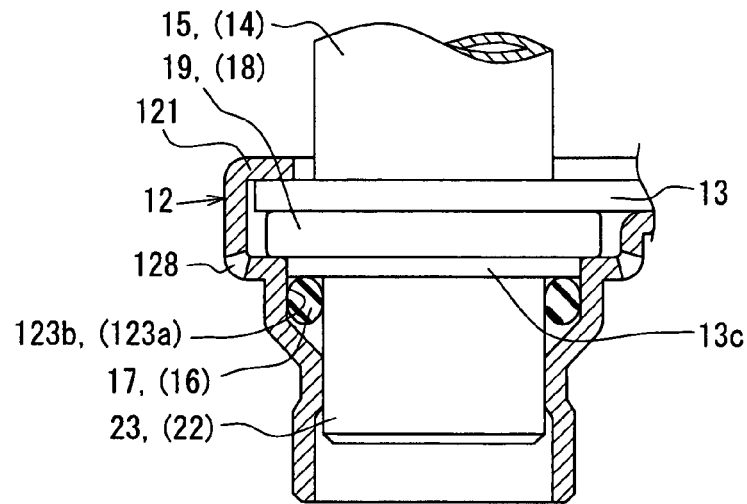

FIG. 6B shows another example of the second embodiment. As shown in FIG. 6B, on both end surfaces of the connection plate 13, the sacrificial corrosive materials 13c may be positioned and formed integrally with the connection plate 13. This can extend a consumption interval of the sacrificial corrosion materials 13c, as compared to the above-described case. Furthermore, when the inlet pipe 14 and the outlet pipe 15 are fixed to the connection plate 13, the sacrificial corrosion materials 13c are disposed on both surface sides of the connection plate 13, resulting in no difference between the front and back sides of the connection plate 13, which can prevent wrong assembly of the connection plate.

Although in the above-described examples of FIGS. 6A and 6B, the sacrificial corrosion member 13c is integrally formed with the connection plate 13, the invention is not limited. The connection plate 13 may be constructed by the sacrificial corrosion member 13c. Furthermore, as described in FIG. 6C, another sacrificial corrosion member 13c may be formed in a washer shape, and provided between the bulge portions 18, 19 and the O-rings 16, 17 in the pipe connection direction.

This can shorten extremely the sacrificial corrosion protection distance D, thereby effectively enabling prevention of corrosion of the seal surfaces of the O-rings 16, 17. Although in each example of FIG. 6A to FIG. 6C, only the structure of the outlet pipe 15 side is shown, the same structure may be applied to the inlet pipe 14 side.

In the second embodiment, the other structure and method can be made similarly to those described in the first embodiment.

Third Embodiment

Figure 8:
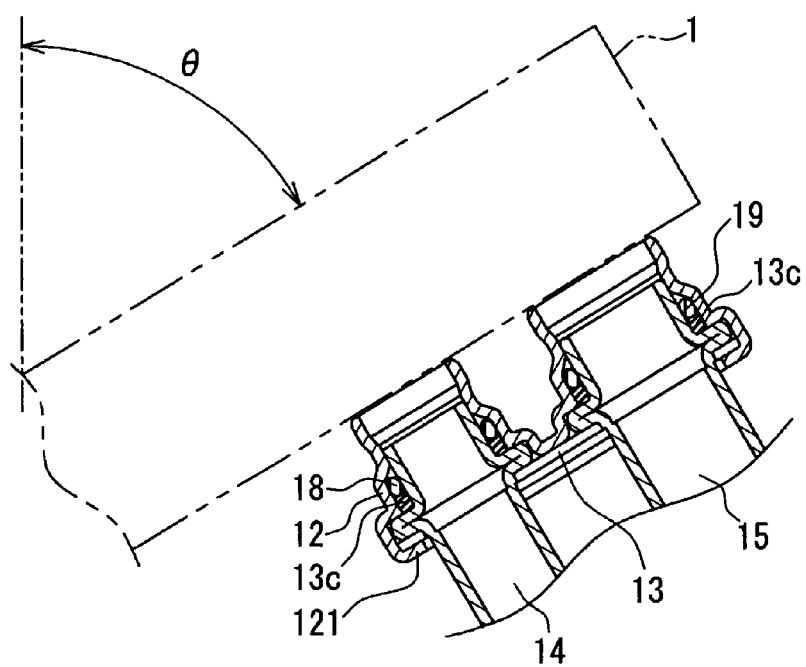
FIG. 8 is a schematic diagram showing a mounted form of a pipe joint structure in an air conditioning duct in the third embodiment.

A third embodiment of the present invention will be now described with reference to FIGS. 7A to 8.

Although in the above-described embodiments, the plurality of drain holes 128 are formed in the root (lower end part) of the connection portion 121 of the socket 12 so as to discharge the condensed water entering the socket 12, drain holes 138a to 138f may be formed in the connection plate 13. In this case, as shown in FIGS. 7A to 7F, the drain holes 138a to 138f can be formed at different positions.

Figure 7A:
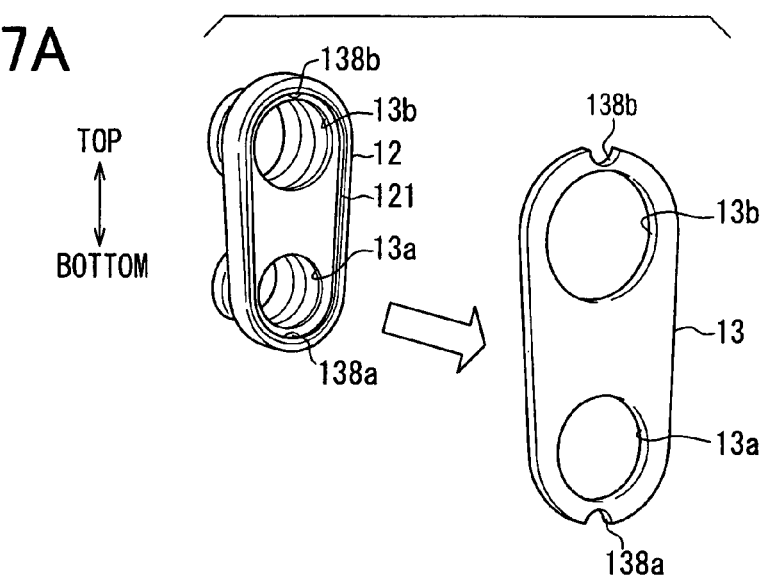
FIGS. 7A to 7F are perspective views showing connection plates according to a third embodiment of the present invention.

When the socket 12 and the connection plate 13 are disposed vertically or in the up-down direction (top-bottom direction in FIG. 7A) such that the inlet pipe 14 and the outlet pipe 15 are arranged in the upper-down direction, that is, in the direction of gravity, as shown in FIG. 7A, the drain holes 138a, 138b may be formed on the upper and lower ends of the connection plate 13. That is, the drain holes 138a, 138b may be provided at least on the uppermost and lowermost parts of the plate in the direction of gravity.

With this, the condensed water occurring in the roots of the inlet pipe 14 and the outlet pipe 15 would be transferred through the clearance between the fastened part of the connection portion 121 and the edge of the connection plate 13 to enter toward the inside of the connection plate 13. However, the drain hole 138a provided on the lowermost part can discharge the condensed water outside the connection plate 13.

The drain hole 138b provided on the uppermost portion has an air release function of discharging air within the connection plate 13.

The condensed water stored in the clearance between the socket 12 and the edge of the connection plate 13 freezes on some of the load conditions of the refrigeration cycle. For example, the inlet pipe 14 and the outlet pipe 15 which are arranged in the upper-down direction are different from each other in temperature of the refrigerant passing through the inside thereof. That is, the refrigerant temperature in the lower inlet pipe 14 is lower than that in the upper outlet pipe 15, so that the refrigerant in the inlet pipe 14 side starts to freeze earlier than that in the outlet pipe 15 side.

Figure 7B:
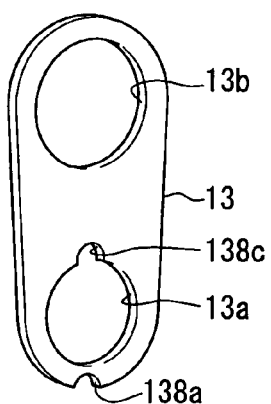

In such a case, as shown in FIG. 7B, the drain hole 138c may be formed in the vicinity of the upper part of the inlet side through hole 13a formed on the lower side in the direction of gravity. The drain hole 138c is integrally formed with the inlet side through hole 13a, and is formed in a substantially half round shape. With this, even when the condensed water starts to freeze inside the lower part of the connection plate 13 and the lowermost drain hole 138a is closed, the internal pressure can be released from the drain hole 138c in the vicinity of the inlet side through hole 13a. In other words, the drain hole 138c in the vicinity of the inlet side through hole 13a has a function of pressure release when the condensed water expands its volume in freezing. This can prevent the frost cracking of the socket 12.

In some cases, the evaporator 1 is mounted while being inclined within an air conditioning duct (not shown) in the air conditioner for a vehicle. For example, as shown in FIG. 8, when an inclined angle θ of the evaporator 1 becomes large, the drain hole 128 formed in the connection portion 121 of the socket 12 is not positioned at the lowermost part in the direction of gravity.

Figure 7C:
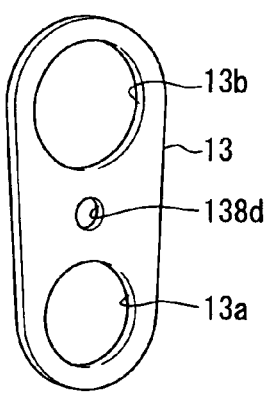

In this case, the lower side of the connection plate 13 is positioned at the lowermost part from the lower end of the socket 12. As shown in FIG. 7C, the drain hole 138d is formed between the inlet side through hole 13a and the outlet side through hole 13b of the connection plate 13.

Figure 7D:
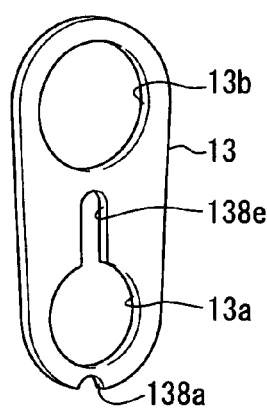

The drain hole 138e extending upward from the inlet side through hole 13a may be formed in such a manner that the drain hole 138c formed in the vicinity of the inlet side through hole 13a is connected to the drain hole 138d formed in the middle position between the inlet side through hole 13a and the outlet side through hole 13b, as shown in FIG. 7D. With this arrangement, by providing the drain hole 138e between the inlet side through hole 13a and the outlet side through hole 13b, the inclined evaporator 1 becomes suitable for the air conditioner for a vehicle to be mounted on the air conditioning duct (not shown).

When fastening the connection portion 121 of the socket 12, a bottom die for holding the bottom of the socket 12 is required. However, the bottom of the socket 12 of the embodiment has a complicated shape. The bottom die of the embodiment is formed so as to support the outer parts of the first, second and third inner peripheral portions 122a, 122b, 123b, 124a, 124b.

Figure 7E:
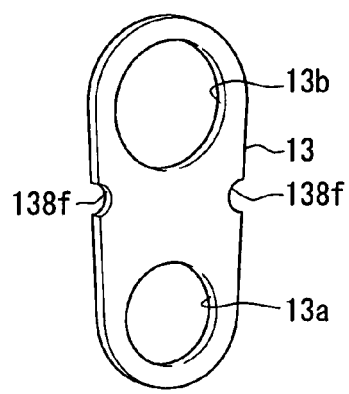

Thus, in the step of fastening, in some cases, a clearance is formed between a flat part of the connection plate 13, that is, a flat part located between the inlet side through hole 13a and the outlet side through hole 13b, and the bulge portions 18, 19. As shown in FIG. 7E, the drain holes 138f are formed in linear positions located outside the midpoint between the inlet side through hole 13a and the outlet side through hole 13b of the connection plate 13, that is, at the outer edges.

In other words, each drain hole 138f is formed on the outer edge at the midpoint on the long side of the connection plate 3. With this, even when the condensed water starts to freeze inside the connection plate 13 and the condensed water stored in the clearance between the flat part and the bulge portions 18, 19 freezes, the internal pressure can be released from the drain holes 138f provided nearby.

Figure 7F:
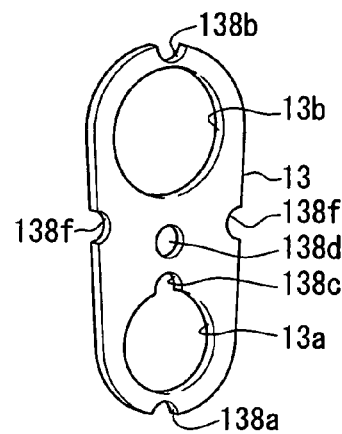

As shown in FIG. 7F, the formation of a plurality of drain holes 138a to 138f in the connection plate 13 enables draining and pressure release according to a mounted form on the air conditioning duct (not shown). Furthermore, at least two of the drain holes 138a to 138f may be provided in the connection plate 13.

In the third embodiment, the other parts can be made similarly to those of the above-described first or second embodiment.

Fourth Embodiment

Figure 9A:
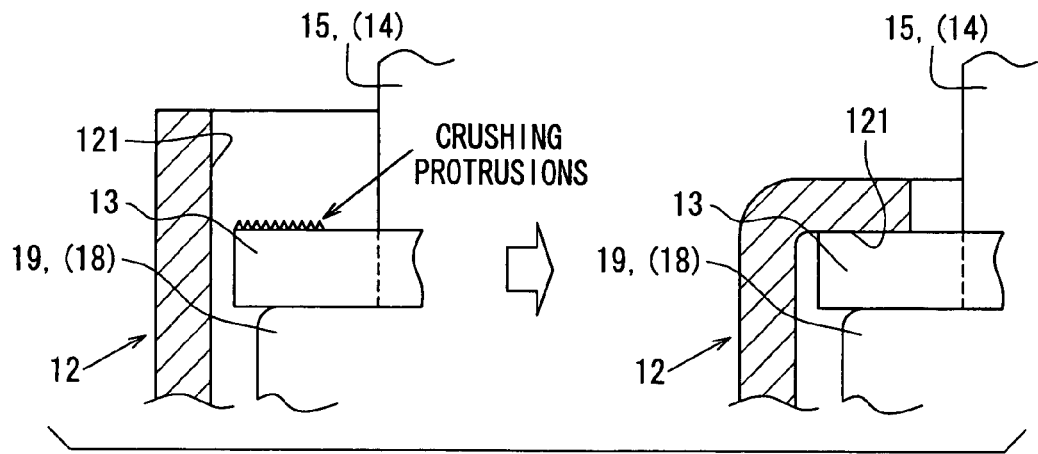
FIGS. 9A to 9C are explanatory diagrams showing structures of fastening portions according to a fourth embodiment of the present invention.

A fourth embodiment of the present invention will be now described with reference to FIGS. 9A to 9C.

In the fourth embodiment, the joint structure is formed such that the condensed water does not enter the fastened part between the connection portion 121 of the socket 12 and the connection plate 13. In other words, the fastened surface of the connection portion 121 is formed to become a metal seal. As shown in FIG. 9A, protrusions are formed on a flat surface near the edge of the connection plate 13, and then crushed to caulk and fasten the surface of the connection portion 121. Thus, the fastened portion (caulked portion) is used as a metal seal, thereby preventing the condensed water from entering the seal surfaces of the O-rings 16, 17.

Figure 9B:
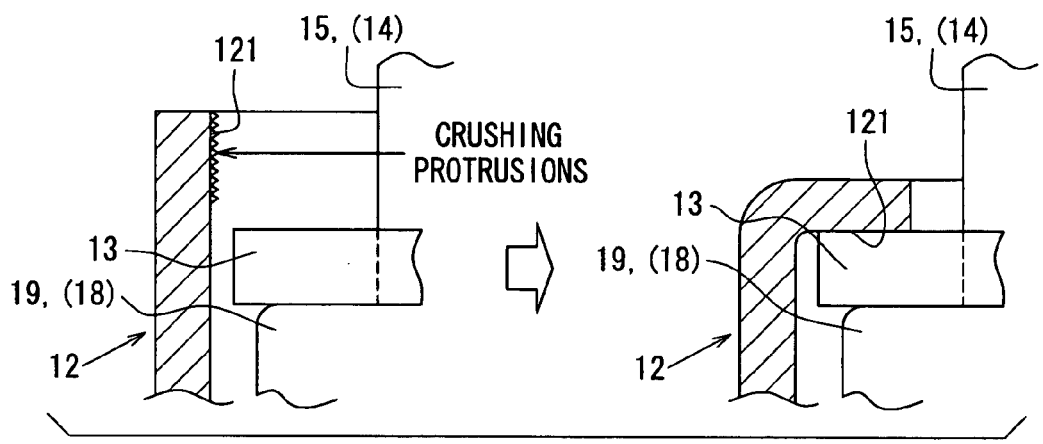
Figure 9C:
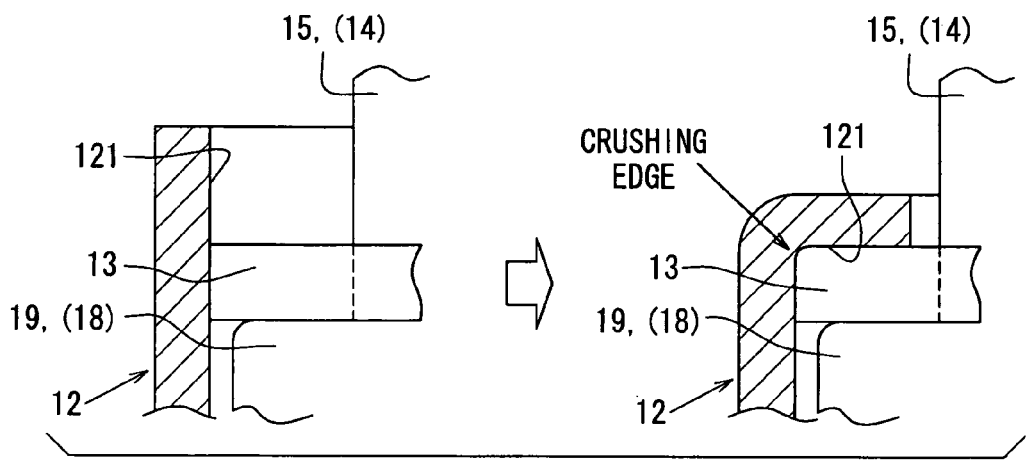

As shown in FIG. 9B, alternatively, protrusions may be formed on a flat surface of the connection portion 121 of the socket 12, and then crushed to be fastened to the connection portion 121. Furthermore, as shown in FIG. 9C, in fastening of the connection portion 121, an edge of the connection plate 13 is crushed to be caulked, thereby preventing the condensed water from invading the seal surfaces of the O-rings 16, 17. Although in each of FIG. 9A to FIG. 9C, only the structure of the outlet pipe 15 side is shown, the same structure may be applied to the inlet pipe 14 side.

Figure 10:
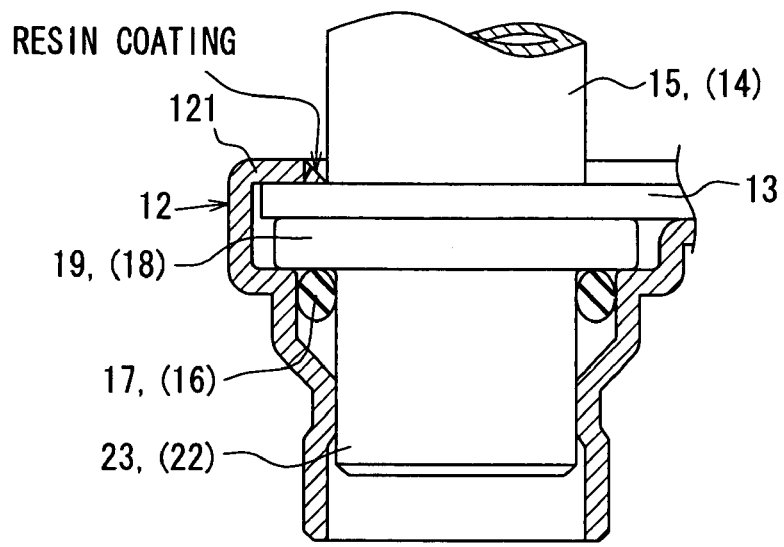
FIG. 10 is a partial sectional view showing a resin coating process after fastening in a modified example of the fourth embodiment.

Although in the embodiment, any one of the socket 12 and the connection plate 13 is formed into a metal seal at the fastened part, after fastening the connection portion 121, a resin coating process may be performed, as shown in FIG. 10, to cover the entire periphery of an abutted part between the tip of the connection portion 121 and the connection plate 13, that is, of the fastened part, thereby preventing the invasion of the condensed water from the fastened part.

Thus, even when the edge of the connection plate 13 is partly fastened, the resin coating process can close the clearance between the socket 12 and the connection plate 13. This can prevent the condensed water from invading the seal surfaces.

In the fourth embodiments, the other parts in the pipe joint structure can be made similarly to those of any one of the above-described first to third embodiments.

Fifth Embodiment

A fifth embodiment of the present invention will be now described with reference to FIGS. 11 and 12.

Figure 11:
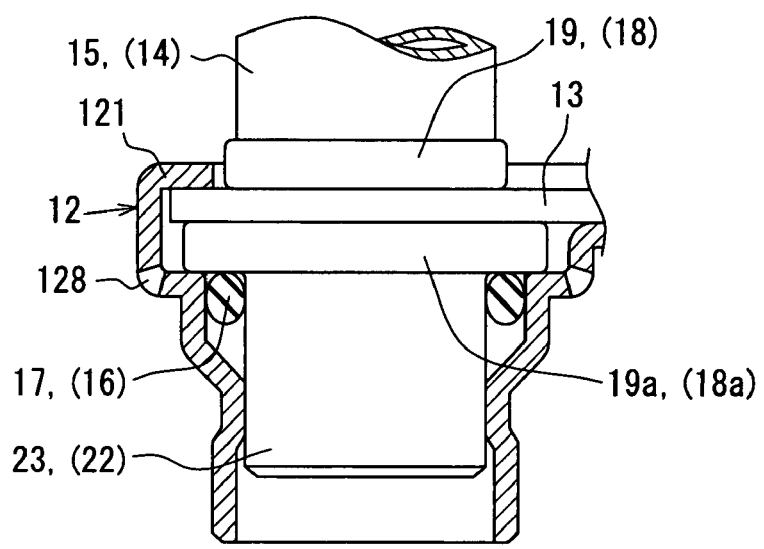
FIG. 11 is a partial sectional view showing-a pipe joint structure for an evaporator (heat exchanger) according to a fifth embodiment of the present invention.
Figure 12:
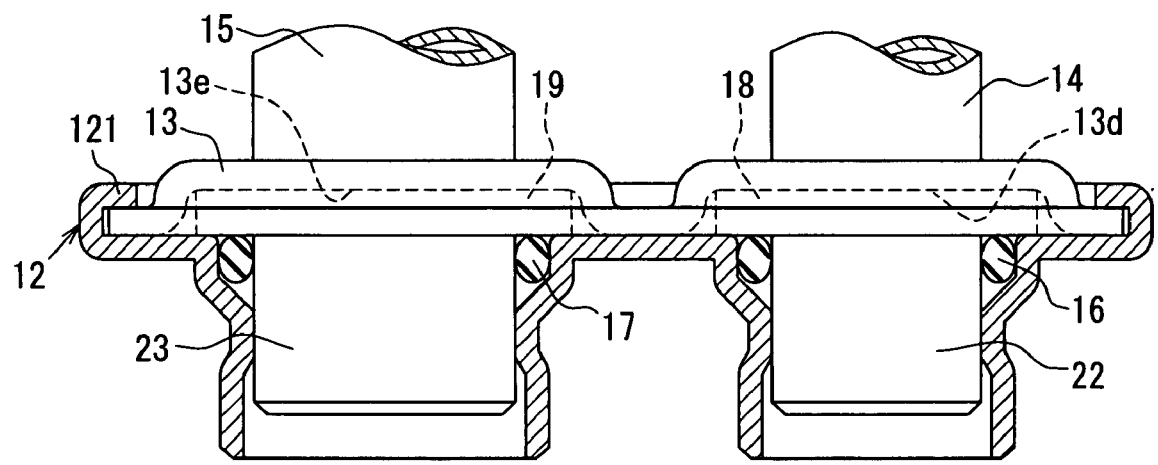
FIG. 12 is a partial sectional view showing a pipe joint structure for an evaporator (heat exchanger) in a modified example of the fifth embodiment.

In the above-described embodiments, the inlet pipe 14 and the outlet pipe 15 are respectively fixed to the connection plate 13 by using the bulge portions 18, 19 being enlarged in size, but may be further provided with a bulge portion 18a, 19a so as to sandwich the connection plate 13 with the bulge portion 18, 19 as shown in FIG. 11. This can ensure fixing of the inlet pipe 14 and the outlet pipe 15 to the connection plate 13 and positioning the attachment pitch between the inlet pipe 14 and the outlet pipe 15.

The bulge portions 18a, 19a may be formed in the inlet pipe 14 and the outlet pipe 15, after the bulge portions 18, 19 are formed by the bulge process at predetermined positions of the inlet side insertion cylindrical portion 22 and the outlet side insertion cylindrical portion 23 of the inlet pipe 14 and the outlet pipe 15.

Then, the connection plate 13 may be inserted so as to abut against one side surfaces of the bulge portions 18, 19, and the other bulge portions 18a, 19a may be formed by the bulge process with the connection plate 13 being inserted. Thus, the connection plate 13 can be sandwiched between the two bulge portions 18 and 18a, (19 and 19a), thereby fixing the inlet pipe 14 and the outlet pipe 15 to the connection plate 13.

Although in the embodiment, the connection plate 13 is formed to be sandwiched between the two bulge portions 18 and 18a (19 and 19a), the invention is not limited thereto. Alternatively, as shown in FIG. 12, the connection plate 13 may be provided with recessed portions 13d, 13e which are to abut against one end surfaces of the bulge portion 18, 19, and then the inlet pipe 14 and the outlet pipe 15 may be enlarged in size such that the one end surfaces of the bulge portions 18, 19 are abutted against the recessed portions 13d, 13e.

This can improve the strength of the pipes in the direction of release (connection direction), and prevent wrong assembly of the connection plate 13 in fixing of the inlet pipe 14 and the outlet pipe 15 to the connection plate 13.

Other Embodiments

Although the present invention has been fully described in connection with the preferred embodiments thereof with reference to the accompanying drawings, it is to be noted that various changes and modifications will become apparent to those skilled in the art.

Figure 13:
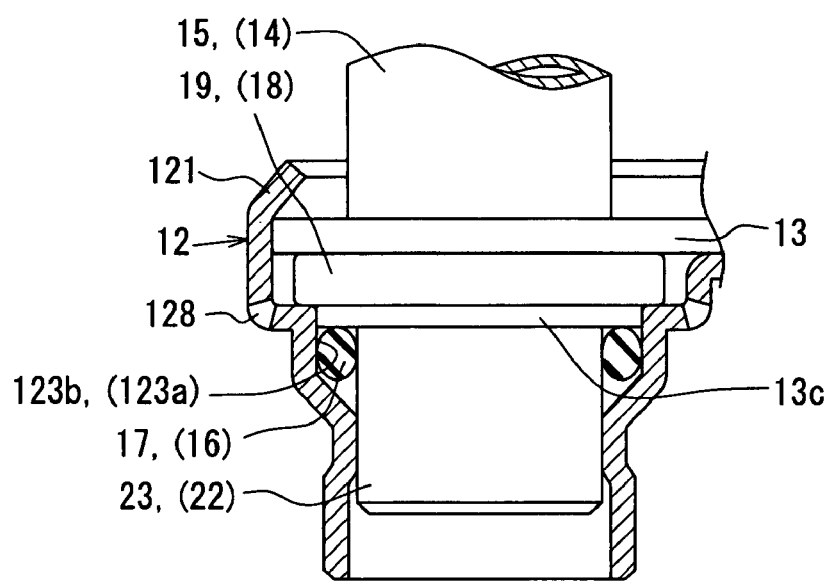
FIG. 13 is a partial sectional diagram showing a pipe joint structure for an evaporator (heat exchanger) according to a modification of the present invention.

For example, in the above-described embodiments, the connection portion 121 is wrapped around and caulked to cover the edge of the connection plate 13, the invention is not limited thereto. Alternatively, as shown in FIG. 13, the connection portion 121 may be tilted and fastened with a slope inward so as to press the upper surface of the connection plate 13. In contrast, for the winding and fastening, two fastening steps are needed. Accordingly, this example of FIG. 13 can omit one step of fastening further inward from the direction of the inclined surface, thereby reducing the manufacturing costs.

Although in the above-described embodiments the socket 12 is formed to be fixed to the inlet pipe 14 having an outer diameter of about ½ inches and to the outlet pipe 15 having an outer diameter of about ⅝ inches, the outer diameter of the pipes is not limited thereto.

In the described embodiments, the invention is applied to the evaporator 1 of the refrigeration cycle for vehicle air conditioning. However, the invention can be applied not only to the evaporator 1, but also to other equivalent heat exchangers. Furthermore, the invention may be applied to a pipe joint apparatus for connecting two fluid flow paths with two pipes, in place of the heat exchanger. The invention may be applied to a pipe joint apparatus for connecting three or more fluid flow paths with three or more pipes.

Such changes and modifications are to be understood as being within the scope of the present invention as defined by the appended claims.

What is claimed is:

1. A heat-exchanger pipe joint structure comprising:
a heat exchanger including an inlet-side refrigerant flow path portion and an outlet-side refrigerant flow path portion;
a socket connected to the inlet-side refrigerant flow path portion and the outlet-side refrigerant flow path portion;
a connection plate disposed to abut against the socket;
an inlet pipe and an outlet pipe, one ends of which are connected to each other by the connection plate;
a joint provided at the other ends of the inlet pipe and the outlet pipe to join the other ends of the inlet pipe and the outlet pipe;
a seal member disposed between the inlet and outlet pipes and the socket; and
a sacrificial corrosive material located on the connection plate;
wherein the socket includes a connection portion that covers an entire outer periphery of the connection plate, the connection portion directly overlapping and fastening the connection plate to the socket.

2. The heat-exchanger pipe joint structure according to claim 1,
wherein one of the connection portion and the connection plate includes a fastening portion having a surface with projections and depressions formed thereon, and
wherein the connection portion is fastened to the connection plate after crushing the projections.

3. The heat-exchanger pipe joint structure according to claim 1,
wherein the connection plate is provided with through holes into which the inlet pipe and the outlet pipe are inserted, and
wherein the inlet pipe and the outlet pipe are fixed to the through holes by being enlarged in a radial dimension.

4. The heat-exchanger pipe joint structure according to claim 1, wherein the sacrificial corrosive material is located at one side of the connection plate at which the seal member is disposed.

5. The heat-exchanger pipe joint structure according to claim 1, wherein the sacrificial corrosive material is located at two sides of the connection plate.

6. A heat-exchanger pipe joint structure comprising:
a heat exchanger including an inlet-side refrigerant flow path portion and an outlet-side refrigerant flow path portion;
a socket connected to the inlet-side refrigerant flow path portion and the outlet-side refrigerant flow path portion;
a connection plate disposed to abut against the socket;
an inlet pipe and an outlet pipe, one ends of which are connected to each other by the connection plate;
a joint provided at the other ends of the inlet pipe and the outlet pipe to join the other ends of the inlet pipe and the outlet pipe; and
a seal member disposed between the inlet and outlet pipes and the socket, wherein
the socket includes a connection portion located to cover an of the connection plate and to fix the inlet pipe and the outlet pipe to the inlet-side refrigerant flow path portion and the outlet-side refrigerant path portion; and
the inlet pipe and the outlet pipe have annular bulge portions formed in the vicinity of the connection plate and protruding in a radial outward direction.

7. The heat-exchanger pipe joint structure according to claim 6, further comprising
a sacrificial corrosive material located between the seal member and at least one of the bulge portions.

8. The heat-exchanger pipe joint structure according to claim 6, wherein the connection plate has a recessed portion, which abuts against one end surface of at least one of the bulge portions.

9. A heat-exchanger pipe joint structure comprising:
a heat exchanger including an inlet-side refrigerant flow path portion and an outlet-side refrigerant flow path portion;
a socket connected to the inlet-side refrigerant flow path portion and the outlet-side refrigerant flow path portion;
a connection plate disposed to abut against the socket;
an inlet pipe and an outlet pipe, one ends of which are connected to each other by the connection plate;
a joint provided at the other ends of the inlet pipe and the outlet pipe to join the other ends of the inlet pipe and the outlet pipe;
a seal member disposed between the inlet and outlet pipes and the socket; wherein
the socket includes a connection portion that covers an entire outer periphery of the connection plate, the connection portion directly overlapping and fastening the connection plate to the socket; and
the socket has a drain hole formed between the connection portion and the seal member.

10. A heat-exchanger pipe joint structure comprising:
a heat exchanger including an inlet-side refrigerant flow path portion and an outlet-side refrigerant flow path portion;
a socket connected to the inlet-side refrigerant flow path portion and the outlet-side refrigerant flow path portion;
a connection plate disposed to abut against the socket;
an inlet pipe and an outlet pipe, one ends of which are connected to each other by the connection plate;
a joint provided at the other ends of the inlet pipe and the outlet pipe to join the other ends of the inlet pipe and the outlet pipe;
a seal member disposed between the inlet and outlet pipes and the socket; wherein
the socket includes a connection portion that covers an entire outer periphery of the connection plate, the connection portion directly overlapping and fastening the connection plate to the socket; and
the connection plate has at least one drain hole formed therein.

11. The heat-exchanger pipe joint structure according to claim 10, wherein the at least one drain hole includes drain holes that are provided at least in uppermost and lowermost positions of the connection plate in the direction of gravity when the inlet pipe and the outlet pipe are arranged in an upper-down direction.

12. The heat-exchanger pipe joint structure according to claim 10, wherein the at least one drain hole includes drain holes that are provided at least at a lowermost position in the direction of gravity of the connection plate and at least in an uppermost position in the direction of gravity of the pipe disposed at a lower side of the connection plate when the inlet pipe and the outlet pipe are arranged in the upper-down direction.

13. The heat-exchanger pipe joint structure according to claim 10, wherein the at least one drain hole is provided between the inlet pipe and the outlet pipe of the connection plate when the inlet pipe and the outlet pipe are arranged in the upper down direction.

14. The heat-exchanger pipe joint structure according to claim 13, wherein the at least one drain hole is provided at an outer edge of the connection plate between the inlet pipe and the outlet pipe.

15. A heat-exchanger pipe joint structure comprising:
a heat exchanger including an inlet-side refrigerant flow path portion and an outlet-side refrigerant flow path portion;
a socket connected to the inlet-side refrigerant flow path portion and the outlet-side refrigerant flow path portion;
a connection plate disposed to abut against the socket;
an inlet pipe and an outlet pipe, one ends of which are connected to each other by the connection plate;
a joint provided at the other ends of the inlet pipe and the outlet pipe to join the other ends of the inlet pipe and the outlet pipe;
a seal member disposed between the inlet and outlet pipes and the socket; and
a resin coating located at a fastened portion of the connection portion; wherein
the socket includes a connection portion that covers an entire outer periphery of the connection plate, the connection portion directly overlapping and fastening the connection plate to the socket.

* * * * *